ବ୍ୟ2,781,286

PHENOLIC RESIN GLUE COMPOSITIONS CONTAINING A VEGETABLE SHELL FLOUR DERIVATIVE

Joseph W. Ayers, Easton, Pa., and John J. Bradley, Jr., Winchester, Mass., assignors to Agrashell, Inc., Los Angeles, Calif., a corporation of Delaware No Drawing. Application May 6, 1953, Serial No. 353,421

14 Claims. (Cl. 154—45.9)

This invention relates to phenolic resin glue compositions containing extender-bodying agents which may be described as finely divided modified vegetable shell materials containing certain alkali derivatives thereof, part if not all of which are water-insoluble. It also relates to plywood bonded by means of such compositions.

Plywood glue compositions have been produced for some years by incorporating natural walnut shell flour in aqueous phenolic resin adhesive solutions and the plywood produced therefrom has possessed the highly desirable properties required for all-weather or marine applications. The amount of the flour successfully utilized in the glue compositions in commercial operations has been limited to about $5/10$ part for each part of the resin solid, the formulation usually being described as a 5:1:1 glue (phenolic resin emulsion of 42% solids content, to extender to water). Since the addition of the extender reduces the amount of resin required and hence lowers the over-all plywood cost, experts have for some time been attempting to provide low cost extenders capable of utilization in the adhesive compositions in larger amounts while at the same time producing plywood of commercially acceptable grade. One such attempt has involved the production and utilization of an extender composed of bark phloem flour modified by reaction with sodium hydroxide requiring cooking at a high temperature. Although larger amounts of this extender can be used in glue compositions, difficulties are encountered in obtaining uniform or stable compositions and the plywood produced therefrom is of lower quality, particularly as to stability against moisture, the plywood produced being only of interior grade.

An ultimate object of the present invention is to provide lower cost plywood glue compositions having desirable flow and other properties for proper application to veneers and at the same time those qualities necessary for producing plywood of superior grades, either for exterior or interior use.

More specifically, an object is to provide new phenolic resin glues of high bonding strength for production of laminate, particularly plywood. Another object is to provide phenolic glue compositions containing large loadings of inexpensive extenders derived from vegetable shell flour, capable of producing plywood of high bond strength at lower cost. Another object is to provide phenolic glue compositions which, although containing large amounts of extender, possess properties permitting them to be spread readily and easily at more favorable spreading rates.

These and other objects of the invention are achieved by incorporating in alkaline phenolic adhesive solutions a substantial quantity of an extender-bodying agent produced by the reaction of vegetable shell flour, derived by finely grinding endocarps of drupes, with an alkali metal hydroxide and with a difficultly soluble alkaline hydroxide. Through this dual alkaline treatment the particles are wholly or in part modified in their chemical content and in their physical properties, and the resulting mass contains various unidentified derivatives apparently including metal-organic complexes or lignates of the polyvalent metals of the hydroxides reacted, the said derivatives being all or at least in substantial part in an insoluble state.

The phenolic materials of the glue compositions of the invention are thermosetting resins of the type suitable for laminating purposes and are referred to in industry as "phenolic resin adhesives." Most commonly, such products constitute alkaline colloidal solutions or aqueous emulsions having from about 42 to 50% resin solids. The resins most generally used in glue compositions and preferred in the present compositions are those resulting from the reaction of alkali catalyzed solutions of phenol and formaldehyde having a pH from about 9.5 to 12. It is also contemplated that phenol-aldehyde resins as are obtained by the reaction of cresol or other substituted phenols with formaldehyde and other aldehydes such as acetaldehyde and paraformaldehyde be used. The resin may be employed in the form of an alcoholic solution or as an aqueous solution, such compositions being known in the art.

A suitable phenolic resin may be produced for example, by reacting 1 mol of phenol with 2 mols of formaldehyde in the presence of sodium hydroxide in an amount of about 3% based on the weight of the phenol, the reaction being carried out at 85 to 100° C. until the proper viscosity is obtained, after which the resulting reaction solution is diluted with a solution of sodium hydroxide to yield a product of about 50% solids, this product being compatible with water and convertible into a hard insoluble product when heated to a temperature above 100° C.

The raw material of the extender-bodying agent used in the practice of the invention defined as "endocarps of drupes" includes shells of nuts, such as walnut, hickory, palm, and filbert; pit shells of fruits such as peach, prune and apricot; the hulls of grains and seeds such as oat hulls and the cones or strobiles of coniferous trees.

The "alkali metal" hydroxide used in the production of the new extender, as defined herein is intended to include ammonium hydroxide as well as the hydroxides of the true alkali metals, as sodium and potassium. The difficulty soluble alkaline hydroxide may be the hydroxide of any one or combination of a large number of metals. There may be mentioned, for example, the hydroxides of calcium, barium, magnesium, zinc, copper, lead, iron, cobalt, nickel, aluminum and manganese. These hydroxides have the common function of providing insoluble reaction products in the reaction mass. They may be thought of as insolubilizing reagents, for in their absence the alkali metal hydroxide would produce only soluble derivatives in the reaction mass.

Although these difficulty soluble alkaline compounds are at least theoretically in the form of hydroxides at the time they are reacted, they need not be introduced into the reaction mixture in such form. These reagents can be introduced in the form of their oxides, as for example, lime, and the oxides of barium, zinc, copper, magnesium and size. The oxides and hydroxides may be referred to collectively as "difficultly soluble hydroxide-providing oxidic compounds."

The amount of the mixture of the two alkaline compounds which can be employed in producing the modified extender varies within wide limits. Although any appreciable amount may produce beneficial results, at least 4% in relation to the amount of the vegetable shell flour treated is ordinarily required. The amount of the reagents employed in any particular instance depends upon several factors including the nature of the raw material treated and the use to which the final product is to be put. Since the amount of lignin in the initial materials differs somewhat, the amount of the reagents which can be reacted varies. No absolute limits can be set forth.

Furthermore, the reaction can be carried out in such manner as to effect complete reaction with substantially all of the lignin present or alternatively the conditions can be regulated such that only a superficial reaction on the particles will be obtained. Finally, the reaction may be carried out in such manner that only a part of the shell flour ultimately to be used will be reacted to any substantial extent with the alkaline reagents. In this latter case the reaction may be carried out initially with all or a part of the soluble alkali and a part of the second alkaline reagent and the reaction may be continued to a more or less extent in the presence of a second addition of shell flour and/or reagent. Under one of the procedures it will be seen that unaltered particles will be present in admixture with the modified particles. The ratio of modified to unmodified flour may be varied to suit particular purposes as from 90:10 to 10:90 parts but ordinarily ratios of 75:25 to 25:75 are desirable for obtaining desirable benefit of the two extenders.

The relative proportions as between the two alkaline reagents which can be employed in the operation of the invention, will vary in relation to the desired quality of the bond to be produced in the plywood or glued products formed. It is preferred that the reagents be used in substantially stoichiometric proportions. Under this procedure, the products produced would contain little or no water-soluble derivatives. If the amount of alkali metal hydroxide used is in excess of the equivalent amount, then soluble components may remain in the mass and lead to final coatings and coverings of inadequate weather-resistance. Any excess of soluble components can be removed from the reaction product if desired, as by diluting with water and decanting. A small proportion of these soluble components, however, may serve a desirable function in some aqueous media in which the products can be employed. Furthermore, if the proportion of the bodying agent in the glue composition is relatively low, as in 5:1:1 formulations, or if the adhesive is to be used to produce interior grade plywood, the presence of an appreciable proportion of soluble components is permissible without excessive sacrifice in quality.

If the amount of difficultly soluble alkaline compound used exceeds that of the alkali metal hydroxide, then the final product may contain a quantity of insoluble alkali corresponding more or less to the amount of the excess. In some compositions and glued products the presence of a small amount of lime or other insoluble material may have no ill effect, but the proportion used must be below that which will cause the resin to precipitate or coagulate. The presence of too large an excess will also cause the bonding strength of the glue to fall off.

The reaction of the shell flour with the alkaline reagents may be carried out at any temperature, as from room temperature to boiling. Ordinarily heat in moderate amounts is desirable to speed up the rate of reaction. The reaction may be carried out without applying heat to the reaction mixture, for ordinarily, adequately elevated temperatures for quick reaction are obtained by utilizing only autogenous heat or the heat of dissolution of the alkali metal hydroxide and the heat of wetting developed when water is mixed with the finely divided organic material. By the utilization of these sources of heat the reaction mass can be increased in temperature by from about 35 to 60 or possibly 70° F. above normal atmospheric temperature dependent on the procedure employed and the quantity of the composition processed in relation to the amount of alkali and water present.

With the temperature increase developed by the reagents, the reaction will proceed adequately in a period of from about 25 to 30 minutes. At higher temperatures the period may be shorter and at lower temperatures the time required is increased.

In an alternative procedure, part of the finely divided shell material is mixed with the alkali metal hydroxide and heated to a higher temperature, as from 160° F. to boiling, after which the reaction mass is permitted to cool somewhat whereupon the difficultly soluble alkaline oxidic compound together with the remainder of the organic material is added. In this reaction the soluble hydroxide can be made to react with most, if not all, of the lignin present in the part of the raw material treated and the presence of the reaction product in solution in the mass will provide a composition of very high viscosity. The line or other difficultly soluble alkaline reagent added to this treated material reacts with the solubilized components apparently made up in part of sodium lignate and forms insoluble compounds in a mass in which the unreacted or only slightly reacted additional shell flour serves at least two functions, namely, as a sealer which prevents excessive penetration when the composition is applied on porous surfaces and as a cost reducer in lessening the amount of more expensive components required.

The modified shell materials herein described constitute excellent extender-bodying agents for the phenolic resin adhesives used particularly in plywood manufacture. Tests have shown that these modified organic materials when mixed with resin glue solutions provide plywood adhesive compositions of increased true viscosity usually also having thixotropic properties both of which properties provide superior action on the spreading rolls. The amount of resin required is greatly reduced, for more of the extender and more water can be incorporated in the adhesive composition.

Glue compositions capable of producing high quality laminates are obtained, for example, by reacting 20 to 50 parts vegetable shell flour with 1 to 10 parts of sodium hydroxide and 1 to 10 parts of calcium oxide in the presence of 20 to 140 parts of water, and mixing with 100 parts ordinary commercial phenolic resin glue emulsion (40–50% solids).

In accordance with an important embodiment of the invention glue compositions are provided having all properties necessary for the production of exterior plywood, which contain higher loadings of lignocellulosic extenders than heretofore possible in commercial operations. These adhesive compositions contain aqueous phenolic resin adhesive solutions (42–50% solids) and extender-bodying agents of the present invention in the ratio range of 5 of the former to 1.6–3 of the latter. For maximum quality the extender-bodying agents should be those prepared under such circumstances as to provide substantially no free soluble components such as would result from the use of quantities of sodium hydroxide in excess of the amount of lime employed.

In accordance with a second important embodiment of the invention, corresponding glue compositions are produced for interior use which likewise contain substantially greater quantities of extender than compositions of comparable grade heretofore produced. In the adhesive compositions for the production of plywood of interior grade, the ratio range of the resin adhesive solution to the extender is 5 to 2–5.

Both of the above-mentioned adhesive compositions possess all qualities required for easy application to veneers and the plywood produced therefrom is of equal or higher quality than corresponding conventional plywoods now commercially produced. The use of high loadings of extender reduces the cost of the adhesive solution and also the cost of fabrication of the plywood.

The properties of the adhesive compositions of the present invention and as well of the plywood produced therefrom can be altered or controlled to some extent by an adjustment of the amount of soluble components, presumably sodium lignate, in the modified shell flour or in the adhesive composition containing the same. If the modified shell flour contains excess soluble components they can be removed therefrom by dilution with water and decanting. On the other hand if improved viscosity or thixotropic properties are desired in the glue compositions a small percentage of sodium lignates may be added thereto.

In the examples to follow, a low viscosity phenolic resin adhesive and a high viscosity phenolic resin adhesive of the conventional types were employed, the same being identifiable by the properties set forth in the accompanying table:

|  | Resin A | Resin B |
|---|---|---|
| Percent solids | 41.6 | 49.4 |
| Viscosity (G&H) | F | X |
| pH at 25° C | 11.85 | 11.1 |
| Water tolerance, percent, at 25° C | Infinite | 800 |

*Example 1*

A glue composition was prepared by mixing for 25 to 30 minutes 100 parts of phenolic resin A with an extender-bodying agent prepared by dry mixing at room temperature for 10 minutes 20 parts of walnut shell flour with 2 parts of sodium hydroxide and 3 parts of calcium oxide. Finally 20 parts of water were added and the stirring continued for 10 minutes when a homogeneous mass was obtained.

*Example 2*

The process of Example 1 was repeated except that an equal quantity of phenolic resin B was substituted for phenolic resin A.

*Example 3*

An adhesive composition was prepared by mixing 100 parts of phenolic resin A with an aqueous suspension of the extender-bodying agent composed of a chemically modified shell flour as produced below, the mixture being stirred for 3 to 5 minutes or until a smooth composition was obtained.

The modified shell flour was prepared by mixing 50 parts of walnut flour with water and then with an aqueous solution prepared by adding 3.85 parts of sodium hydroxide to an aqueous mass containing 3.85 parts of calcium oxide, the amount of water in the mixture being 100 parts. When the reaction had gone to completion, an additional 30 parts of water was added to cool the mixture, thereby producing the aqueous suspension used.

*Example 4*

The process of Example 3 was repeated except that the extender-bodying agent employed was prepared with a different amount of sodium hydroxide, it being increased from 3.85 parts to 7.7 parts.

*Example 5*

Fifty parts of dry walnut shell flour were first wetted by mixing with sufficient water required to provide a slurry, amounting to 80 parts, the mixing being continued for about 5 to 10 minutes until the flour was thoroughly wetted. Thereupon a freshly prepared 15–30% solution of sodium hydroxide in an amount of 7.7 parts alkali containing calcium oxide in an equal amount was added to the wetted shell flour and the whole mixed for about 25 to 30 minutes. Thereupon the remainder of the water amounting to 30 parts was added to the mixture and stirred for 5 minutes. Finally 100 parts of phenolic resin B was added to the extender-bodying agent thereby obtained and the mixing was continued for from 5 to 10 minutes until a uniform mixture was obtained.

*Example 6*

A glue composition was prepared by mixing for 5 to 10 minutes 100 parts of phenolic resin A with an extender-bodying agent prepared by dry mixing at room temperature for 20 minutes 50 parts of walnut shell flour with 7.7 parts of sodium hydroxide and 7.7 parts of calcium oxide, adding 110 parts of water and mixing for 25 to 30 minutes, and finally adding 20 parts of water after which the stirring was continued for 10 minutes when a homogeneous mass was obtained.

*Examples 7, 8 and 9*

The procedure of Example 5 using only 3.85 parts of each of the alkaline reagents was followed except that in three separate runs the calcium oxide was replaced by barium hydroxide, using resin B (Example 7), by magnesium hydroxide using resin A (Example 8) and by zinc hydroxide using resin A (Example 9). Substantially the same results were obtained when these glue compositions containing the respective extender-bodying agents were used in bonding plywood.

*Example 10*

Twenty-five parts of walnut shell flour were mixed with 56 parts of water for two minutes at a temperature of 185° F. whereupon there was added a mixture of 3.85 parts sodium hydroxide, 2 parts of calcium oxide and 11.4 parts of water. The resulting mass was mixed for 25 minutes at the same temperature and then it was cooled to 130° F., thereby producing the extender-bodying agent. Thereupon when 100 parts of resin A were added, and after mixing for ten minutes 25 parts of walnut shell flour was introduced and mixed for ten minutes. Finally 41.4 parts of water were added and the mixing continued for ten minutes more.

*Example 11*

Thirty-seven parts of walnut shell flour and 83 parts of water were mixed at a temperature of 185° F. for two minutes. Thereupon 5.70 parts of sodium hydroxide, 2.85 parts of calcium hydroxide and 17.10 parts of water were added and reaction was carried out by continuing the heating at the same temperature during mixing for 24 minutes. Thereupon 100 parts of resin A were added and mixed in for ten minutes and finally 13 additional parts of walnut shell flour were added and the stirring continued for an additional ten minutes.

Substitution in the foregoing examples of vegetable shell flours produced from any of the endocarps hereinbefore described produces substantially the same or comparable results.

In order to illustrate the effectiveness of the alkali treatment in improving the performance of the plywood adhesives and the plywood produced therefrom, the process of Example 1 was altered to substitute ordinary or unmodified walnut shell flour for the modified shell flour used in the present invention, all other conditions being the same. The viscosity of the adhesive compositions was less and the strength and durability of the plywood was less. The adhesive compositions of the present invention furthermore could be spread more readily in thin films. This "control" process and results are set forth as run A in the accompanying table.

To illustrate the effectiveness of the combined alkali treatment as contrasted with treatment by sodium hydroxide alone, the process of Example 1 was repeated except that the treatment with calcium oxide was omitted. Although viscosity requirements of the adhesives were satisfactory, the shear strength and wood failure were substantially less. Furthermore, a larger amount of the glue solution was required to obtain adequate coverage (run B).

The glue compositions described herein are suitable for the production of plywood in accordance with conventional commercial procedures using normal press temperatures of 280 to 310° F. and pressures of 200 to 250 pounds per sq. inch. The reaction will advance rapidly during 1 to 6 minute pressing cycles.

To test the compositions of the examples runs A and B, the glues were spread by means of a mechanical roll spreader, at about equal weights, double glue line on one-eighth inch veneer for producing 3 ply plywoods. Assembly times were thirty minutes, pressing time 3 minutes at 300° F. under pressure of 200 pounds per square inch, followed by a post cure at about 120° F. for eight hours.

The comparative results of the plywood samples were as follows:

| Example | 1 | 2 | 3 | 4 | 5 | 6 | 7 | 8 | 9 | 10* | 11* | Run A | Run B |
|---|---|---|---|---|---|---|---|---|---|---|---|---|---|
| Resin A | 100 |  | 100 | 100 | 100 |  |  | 100 | 100 | 100 | 100 | 100 | 100 |
| Resin B |  | 100 |  |  |  | 100 | 100 |  |  |  |  |  |  |
| Walnut shell | 20 | 20 | 50 | 50 | 50 | 50 | 50 | 50 | 50 | 25 | 37 | 20 | 20 |
| NaOH | 2 | 2 | 3.85 | 7.7 | 7.7 | 7.7 | 3.85 | 3.85 | 3.85 | 3.85 | 5.70 |  | 2 |
| CaO | 3 | 3 | 3.85 | 3.85 | 7.7 | 7.7 |  |  |  | ³2.0 | 2.85 |  |  |
| Ba(OH)₂ |  |  |  |  |  |  | 3.85 |  |  |  |  |  |  |
| MgO |  |  |  |  |  |  |  | 3.85 |  |  |  |  |  |
| ZnO |  |  |  |  |  |  |  |  | 3.85 |  |  |  |  |
| Water with alkali |  |  |  |  | 20 |  | 14 | 14 | 14 | 11.4 | 17.10 |  |  |
| Water in mix | 20 | 50 | 100 | 100 | 80 | 110 | 79 | 79 | 79 | 56 | 83 | 20 | 20 |
| Water to cool |  |  | 30 | 30 | 30 | 20 | 26 | 26 | 26 |  |  |  |  |
| Adhesive vis. cp.: |  |  |  |  |  |  |  |  |  |  |  |  |  |
| Fresh | 2,400 | 7,200 | 1,600 | 4,000 | 12,800 | 7,200 | 6,400 | 4,000 | 5,600 | 50,000 | 23,200 | 1,600 | 2,800 |
| 30 min. roll | 2,600 | 8,400 | 1,600 | 5,600 | 16,400 | 4,000 | 7,200 | 4,300 | 6,400 | 104,000 | 52,200 | 2,400 | 4,200 |
| Aged 18 hrs | 4,000 | 11,200 | 800 | 5,600 | 13,600 | 2,400 | 5,200 | 4,800 | 4,800 | (⁴) | 50,800 | 2,000 | 5,600 |
| Shear p. s. i.: |  |  |  |  |  |  |  |  |  |  |  |  |  |
| Dry | 315 | 225 | 240 | 253 | 255 | 390 | 205 | 255 | ¹302 | 316 | 350 | 270 | 290 |
| Wet-boil | 185 | 147 |  |  |  | 275 |  | 215 |  | 162 | 205 | 160 | 200 |
| Wet-soak |  |  | 168 | 205 | 160 |  | 215 |  | 225 | 233 | 230 |  |  |
| Wood failure, percent: |  |  |  |  |  |  |  |  |  |  |  |  |  |
| Dry | 94 | 100 | 100 | 92 | 82 | 95 | 85 | 91 | ¹93 | 86 | 91 | 98 | 95 |
| Wet-boil | 100 | 90 |  |  | 80 | 97 |  | 80 |  | 73 | 85 | 90 | 68 |
| Wet-soak |  |  | 93 | 88 | 75 |  | 80 |  | ¹85 | 85 | 90 |  |  |
| Adhesive spread, lbs./M sq. ft | 48 | 49 | 48 | 51 | 52 | 48 | 43 | 54 | 44 | 47 | 46 | ²54 | ²53 |
| Temp. increase | 43 | 40 | 54 | 52 | 77 | 59 | 55 | 52 | 42 |  |  | 35 | 44 |

¹ Results of 15 minutes' assembly time.
² Lower spreads could not be made with even covering.
³ Calcium hydroxide used instead of CaO.
⁴ Very heavy.
* In Example 10 an additional 25 parts of walnut shell flour and 41.4 parts of water were added. In Example 11 an addition of 13 parts of walnut shell flour were added.

The practice of the present invention leads to a number of advantages including the following:

A. The adhesive compositions possess true viscosities and generally also thixotropic qualities highly desirable for proper application to plywood in commercial operations. Such properties are retained for surprisingly long periods of time and lead to even spreads on the veneer.

B. The adhesive compositions may be spread more thinly and hence the amount of resin required is reduced.

C. The adhesive compositions can carry higher loadings of the modified extenders, and hence the lower resin content required means lower cost of the glue and lower cost of the plywood, especially of exterior types, or other laminates.

D. Because of the stability of the resin component in the adhesive composition the assembly time in producing the plywood may be raised from the normally allowed ten minutes to about thirty minutes without sacrifice in quality of the bond.

E. The laminates produced possess a high bond strength which is retained at a high level during aging.

We claim:

1. A glue composition comprising an alkaline phenolic-aldehyde resin adhesive solution containing as an extender-bodying agent a vegetable shell flour which has been reacted with an alkali metal hydroxide and with a difficulty water-soluble alkaline hydroxide to an extent which has modified at least in substantial part its lignin content and ultimately converted the same at least in substantial part into a water-insoluble state.

2. A glue composition comprising an aqueous alkaline phenolic-aldehyde resin adhesive solution containing as an extender-bodying agent a substantially water-insoluble reaction mixture obtained by reacting a vegetable shell flour with an alkali metal hydroxide and with a difficulty water-soluble alkaline hydroxide to an extent which modified at least a substantial part of its lignin content and converts the same ultimately into a water-insoluble state.

3. A glue composition comprising an aqueous alkaline phenolic-aldehyde resin adhesive solution containing as an extender-bodying agent a vegetable shell flour the lignin content of which at least in substantial part has been modified by reaction with an alkali metal hydroxide and with a difficulty water-soluble alkaline hydroxide, the hydroxides being used in substantially equivalent amounts.

4. A glue composition for producing exterior grade plywood which comprises an alkaline phenolic-aldehyde resin adhesive solution of about 40–50% solids content containing as an extender-bodying agent and in the ratio range of 5 of the former to 1.6–3 of the latter a substantially water-insoluble, vegetable shell flour the lignin content of which at least in substantial part has been modified by reaction with an alkali metal hydroxide and with a difficulty water-soluble alkaline hydroxide.

5. A glue composition for producing interior grade plywood which comprises an aqueous alkaline phenolic-aldehyde resin adhesive solution containing as an extender-bodying agent and in the ratio range of 5 of the former to 2–5 of the latter a substantially water-insoluble, vegetable shell flour the lignin content of which at least in substantial part has been modified by reaction with an alkali metal hydroxide and with a difficulty water-soluble alkaline hydroxide.

6. A glue composition comprising an alkaline phenol-formaldehyde resin aqueous emulsion containing as an extender-bodying agent a substantially water-insoluble, vegetable shell flour the lignin content of which at least in substantial part has been modified by reaction with an alkali metal hydroxide and with a difficulty water-soluble alkaline hydroxide.

7. A glue composition comprising an alkaline phenolic-aldehyde resin adhesive solution containing as an extender-bodying agent a substantially water-insoluble vegetable shell flour the lignin part of which has been modified by reaction with at least 4% of a mixture of an alkali metal hydroxide and a difficultly soluble alkaline hydroxide.

8. A plywood glue composition comprising an aqueous alkaline phenolic-aldehyde resin adhesive solution containing a substantially water-insoluble vegetable shell flour the lignin content of which at least in substantial part has been modified by reaction with an alkali metal hydroxide and with a difficultly water-soluble alkaline hydroxide and containing also an addition of a natural vegetable shell flour.

9. A thixotropic glue composition for bonding laminates comprising an alkaline phenolic-aldehyde resin adhesive solution containing as an extender-bodying agent a finely divided endocarp of a drupe the lignin content of which at least in substantial part has been modified by reaction with sodium hydroxide and with a difficultly water-soluble alkaline hydroxide, the said agent being for the most part insoluble in water.

10. A thixothropic glue composition for bonding laminates comprising an alkaline phenolic-aldehyde resin adhesive solution containing as an extender-bodying agent a finely divided endocarp of a drupe the lignin content of which at least in substantial part has been modified by reaction with sodium hydroxide and with calcium hydroxide, the said agent being substantially insoluble in water.

11. A thixotropic glue composition for bonding laminates comprising an alkaline phenolic-aldehyde resin adhesive solution containing as an extender-bodying agent a substantially water-insoluble reaction mixture obtained by treating a vegetable shell flour with sodium hydroxide and with calcium hydroxide until a substantial part of its lignin content is reacted.

12. A thixotropic glue composition for bonding laminates of all weather grade, comprising an aqueous alkaline phenolic-aldehyde resin adhesive solution, of about 40–50% resin content, containing as an extender-bodying agent a substantially water-insoluble, finely divided endocarp of a drupe the lignin content of which at least in substantial part has been modified by reaction with sodium hydroxide and with a difficultly water-soluble alkaline hydroxide, the ratio of the adhesive solution to said agent being within the range of 5 to 1.6–3 respectively.

13. Plywood bonded by a glue comprising a phenolic-aldehyde resin adhesive containing therein an extender comprising a vegetable shell flour which has been modified by reaction of at least a substantial part of its lignin content with an alkali metal hydroxide and with a difficultly soluble alkaline hydroxide and left in an insoluble state.

14. Plywood of exterior grade bonded by a glue comprising a phenolic-aldehyde resin adhesive containing therein a substantially water-insoluble extender comprising a vegetable shell flour which has been modified by reaction of at least a substantial part of its lignin content with an alkali metal hydroxide and with a difficultly water-soluble alkaline hydroxide, the hydroxides being used in substantially equivalent amounts and the ratio of adhesive solution (about 40–50% resin content) to said extender in the glue solution used to produce the plywood being within the range of 5 to 1.6–3 respectively.

References Cited in the file of this patent

UNITED STATES PATENTS

| | | |
|---|---|---|
| 1,941,059 | Steele et al. | Dec. 26, 1933 |
| 2,507,465 | Ayers | May 9, 1950 |
| 2,574,785 | Heritage | Nov. 13, 1951 |